May 12, 1959 D. E. CARLSON 2,886,269
ADJUSTABLE SUPPORT FOR TRANSMISSION LINES
Filed Feb. 15, 1956 2 Sheets-Sheet 1

Inventor
Donald E. Carlson
by Mason, Kolehmainen, Rathburn and Wyss
Attorneys

May 12, 1959     D. E. CARLSON     2,886,269
ADJUSTABLE SUPPORT FOR TRANSMISSION LINES
Filed Feb. 15, 1956     2 Sheets-Sheet 2
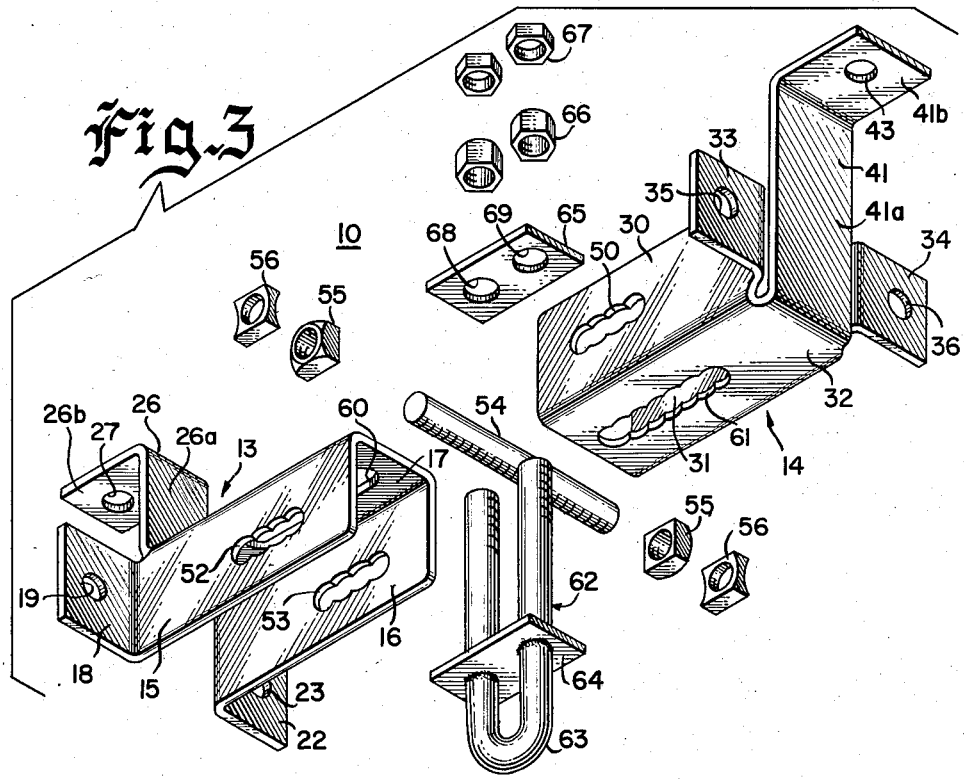
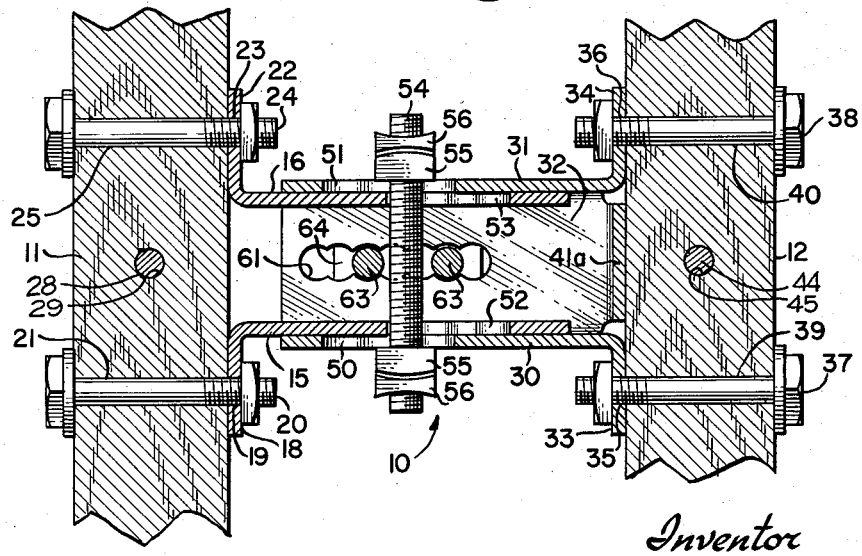
Inventor
Donald E. Carlson

United States Patent Office 2,886,269
Patented May 12, 1959

2,886,269

ADJUSTABLE SUPPORT FOR TRANSMISSION LINES

Donald E. Carlson, Highland Park, Ill., assignor to Joslyn Mfg. & Supply Co., Chicago, Ill., a corporation of Illinois Application February 15, 1956, Serial No. 565,575

4 Claims. (Cl. 248—70)

This invention relates to an improved adjustable support for transmission lines, and more particularly, to an improved adjustable spacer member for use in supporting a transmission line insulator string and attached transmission line conductor from two spaced cross arms carried by line supporting poles.

In erecting transmission line supports using poles, one problem has been that of providing an adjustable cross arm spacer member having an adjustable length to accommodate the variable spacing between the pole cross arms due to the different diameters of the pole itself. As is well known in the art, non-adjustable spacer members have the disadvantage that a multitude of different sized fittings, or, more specifically, different length fittings, must be stocked, sold and used to maintain pole cross arms in a predetermined spaced apart relationship, depending upon the diameter of the associated pole. Various adjustable spacer supports have been proposed of the type in which the component parts are adapted to be placed in side-by-side relationship and secured together by several simple bolts disposed within aligned apertures defined in the components. In working with the larger size line material equipment, it became apparent that in order to provide the proper amount of rigidity for the adjustable support, the size of the adjustable support member had to be increased to such an extent that it become too heavy and bulky for facile storage and handling.

It would, therefore, be desirable to develop a simple, relatively light, and easily operable adjustable support comprising component parts which would be adapted to be interfitted or nested within one another. It would also be advantageous to provide the component parts with a configuration such that the parts may be fixedly secured to the sides of the cross arms and also to the tops of the cross arms, thereby increasing the strength, rigidity and ability of the support to support line insulating equipment therefrom.

Accordingly, it is an object of the present invention to provide an improved adjustable support which obviates the described disadvantages of the prior art arrangements.

Another object of the present invention is to provide an adjustable support embodying a pair of inverted and interfitting channel members having depending feet adapted to abut against the sides and tops of spaced pole cross arms.

It is a further object of the present invention to provide an adjustable support comprising a pair of interfitting channel members in which is defined in portions thereof a plurality of apertures adapted to accommodate a locking means, which locking means may be disposed within a selected set of aligned apertures to change the effective length of the support.

Another object of the present invention is to provide an adjustable support of the type including a pair of interfitting channel members in which are defined longitudinal openings in the flanges thereof for accommodating a first locking means which serves to maintain the members in interfitting relationship and to provide means for carrying auxiliary pole line equipment; and in which are defined longitudinal openings in the webs thereof for accommodating a second locking means which serves to maintain the members in interfitting relationship and to support line insulating equipment therefrom.

Other objects and advantages of the present invention will become apparent from the following description of an illustrative embodiment thereof, in the course of which reference is had to the accompanying drawings wherein:

Fig. 3 is a perspective exploded view of the adjustable support of Fig. 1; and

Fig. 4 is a view, shown principally in section, taken along the lines 4—4 of Fig. 1.

Briefly, and in accordance with the present invention, there is provided an adjustable support comprising a pair of channel members adapted to be inverted and interfitted for slidable longitudinal movement. To fixedly secure the respective channel members to and between a pair of spaced pole cross arms, there are provided at one end of the channel flanges apertured feet adapted to accommodate fastening means for securing the channel members to the sides of the cross arms. In addition, the webs of the channel members are provided with extended brackets, disposed in the same plane as the apertured feet, which brackets have depending terminal end projections to accommodate fastening means for fixedly securing the channel members to the top of the pole cross arms. In order to permit adjustment of the effective length of the adjustable spacer member, a plurality of apertures are defined in the flanges of the channel members to accommodate a first locking means adapted to be disposed within selected sets of said flange apertures in registry. In addition, the first locking means functions to maintain the channel members in interfitting relationship and to provide means for carrying auxiliary pole line equipment. The channel members are also maintained in interfitted relationship by slotting the webs thereof and inserting therethrough a second locking means, including a U-bolt. Moreover, the U-bolt serves to support any type of line material equipment from the bight portion thereof. It will be readily appreciated that selective lengths of the adjustable support may be obtained by adjusting the amount of horizontal interfitting of the channel members and disposing the first-mentioned locking means through the aligned flange apertures.

Figure 1:
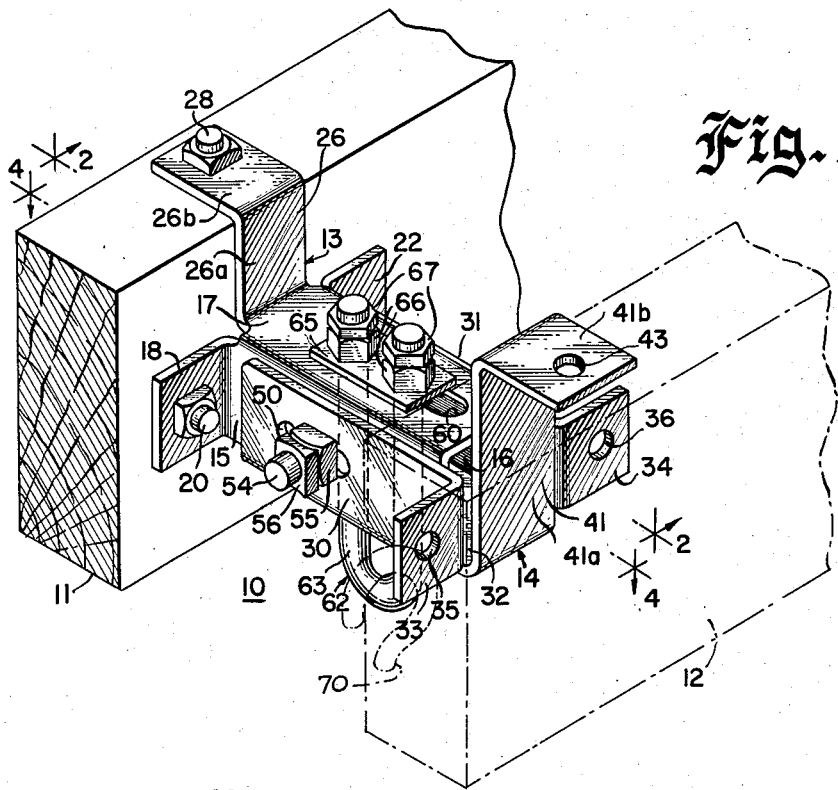
Fig. 1 is a perspective view of an adjustable support shown in assembled relationship and supported by and between a pair of pole cross arms.

Referring now to the drawings, and more particularly to Fig. 1, there is illustrated an adjustable support embodying the features of the present invention, generally designated by the reference numeral 10 and shown disposed between a pair of pole cross arms 11 and 12. These cross arms extend in parallel relationship and are supported adjacent the tops of a pair of transmission line poles in an entirely conventional manner. The adjustable support comprises a pair of channel members 13 and 14 respectively, which are adapted to be horizontally and vertically nested or interfitted together, as best shown in Fig. 1.

As shown in Figs. 1, 3 and 4 the channel member 13 includes a pair of parallel flanges 15 and 16 interconnected by a web 17, normally disposed relative to the flanges 15 and 16. When the channel member 13 is in operative position, the flanges 15 and 16 extend downwardly from the web 17. At one end of the flange 15 there is provided a right angularly bent foot 18 having an aperture 19, stamped, drilled or punched therein, for accommodating suitable fastening means 20 inserted horizontally through a bore 21 in the cross arm 11. Similarly, the flange 16 of the channel 13 is provided with a right angularly bent foot 22 having an aperture 23 to accommodate suitable fastening means 24 inserted horizontally through a bore 25 in the cross arm 11. In this manner, the feet 18 and 22 are disposed in oppositely extended directions in the same plane to fixedly secure the channel member 13 to the side of the cross arm 11. To provide additional support for the channel member 13 and to increase the strength of the adjustable support 10, the end of the web 17, adjacent to the feet 18 and 22, is extended and deformed to define a bracket 26 including an extension 26a bent right angularly to the web 17 and lying in the same plane as the oppositely extending feet 18 and 22 and including a projection 26b depending from the extension 26a, such that the bracket 26 is bent conformably to the side and top surface of the cross arm 11. The projection 26b is apertured as indicated at 27 to accommodate suitable fastening means 28 inserted vertically through the bore 29 in the cross rail 11, which bore 29 is disposed between and is perpendicular to the bores 21 and 25.

Figure 2:
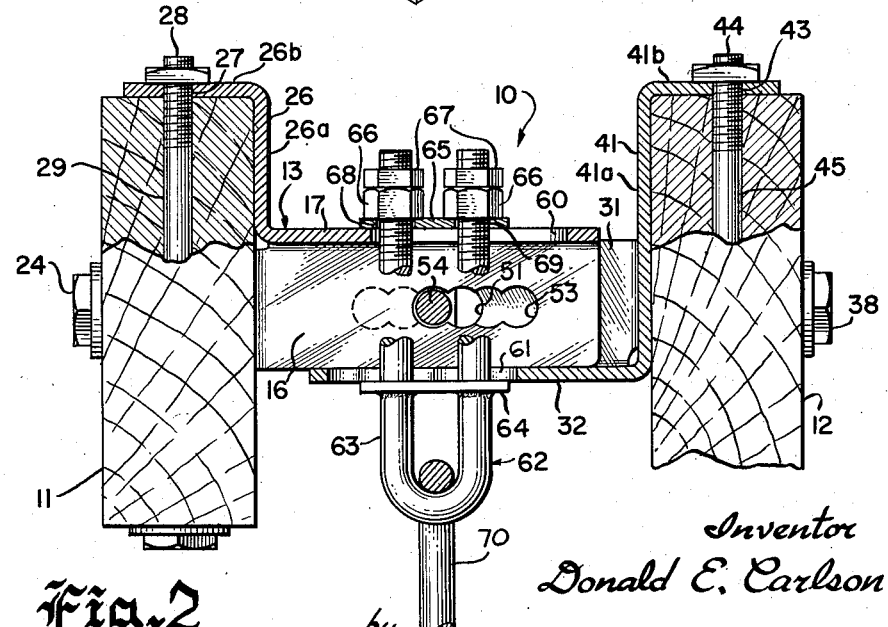
Fig. 2 is a view taken along line 2—2 of Fig. 1, shown partially in section, of the adjustable support of Fig. 1.

The other interfitting channel member 14, as shown in Figs. 1 and 3, has the same general configuration as the channel member 13 and is adapted to be fixedly secured to the cross arm 12 in generally the same manner as the channel member 13 is secured to the cross arm 11. In particular, the channel member 14 has a pair of parallel flanges 30 and 31 which, when in operative position, extend upwardly from an interconnecting web 32. The web 32, however, has a greater width than the web 17 to permit the channel member 13 to be inverted and interfitted within channel member 14, whereby the longitudinal edges of the flanges 15 and 16 slidably engage the upper surface of the web 17 in the manner best shown in Fig. 2. It will be appreciated that the effective length of the support 10 may be adjusted by varying the degree of longitudinal interfitting and, more specifically, by slidably moving the edges of the flanges 15 and 16 along the web 32. In order to secure the channel member 14 to the side of the cross arm 12, one set of ends of the flanges 30 and 31 are provided with right angularly bent, oppositely extending feet 33 and 34, respectively, which are disposed in planar relationship. Apertures 35 and 36 are formed in the feet 33 and 34, respectively, for receiving therethrough suitable fastening means 37 and 38 inserted horizontally within bores 39 and 40 of the cross arm 12. In contrast to the bracket 26 of the downwardly disposed channel member 13, which is bent upwardly and away from the feet 18 and 22, the web 32 is extended to define a bracket 41 having an extension 41a deformed upwardly in the same direction as the flanges 30 and 31 and lying in planar relationship to the feet 33 and 34. The bracket 41 further includes a projection 41b depending right angularly from the extension 41a in which is defined an aperture 43 for accommodating suitable fastening means 44 vertically disposed within a bore 45 of the cross arm 12, which bore 45 is disposed between and perpendicular to the bores 39 and 40 associated with the fastening means 37 and 38, as best shown in Fig. 2. The lengths of the extensions 26a and 41a are so proportioned that when the support 10 is in operative position, as shown in Fig. 2, the channel members are disposed perpendicularly to the sides of the cross arms 11 and 12.

It will be appreciated that the flange arrangement described above serves to increase the fastening rigidity of the adjustable spacer member to the cross arms 11 and 12, by securing the individual channel members, and, in particular, the flanges and web brackets thereof to both the side and top surfaces of the spaced apart cross arms 11 and 12. Moreover, the brackets of the webs are of such configuration as to be attached to both the side and top surface of the pole cross arms, thereby substantially increasing the ability of the adjustable support to support or carry associated line material equipment supported from the support 10 in the manner described hereinafter.

Adjustability of the adjustable support 10, and, in particular, the amount of horizontal interfitting of the channel members 13 and 14, is achieved by defining in the flanges 15, 16, 30 and 31 a plurality of apertures 52, 53, 50 and 51, respectively. These apertures are arranged in longitudinal rows in their respective flanges. More specifically, the plurality of apertures are so spaced in each flange that portions of each aperture are in communication with adjacent apertures and, furthermore, the apertures are so located relative to the webs that when the channel members 13 and 14 are inverted and interfitted, sets of apertures, one in each of the flanges, are in registry. In order selectively to change the length of the adjustable support 10, locking means comprising a simple bolt 54, tightening nuts 55 and locking nuts 56 are provided. This bolt is adapted to be inserted within a selected and aligned set of apertures 50, 51, 52 and 53 and secured fixedly in place by the threaded nuts 55 and 56. To facilitate entry and withdrawal of the bolt 54 through any selected set of apertures, it is apparent that the diameter of the apertures must be somewhat larger than the diameter of the bolt 54. This arrangement for obtaining length adjustability does not produce continuous adjustability from a minimum to a maximum effective length, but only provides for a series of selected effective lengths. It will be appreciated that the overall length of the plurality of apertures is limited by the requirement of rigidity for the adjustable support 10 since a predetermined amount of horizontal interfitting is required to maintain a minimum strength for the adjustable support 10. The locking means, and in particular the bolt 54, may be easily removed from a selected set of apertures, the channel members slidably moved, and the bolt 54 inserted into a second selected set of apertures, to quickly and easily adjust the effective length of the adjustable support 10. In addition, the locking means, including the bolt 54, is used to carry auxiliary pole line equipment (not shown), as, for example, a knee brace disposed between the support 10 and the top of the pole (not shown).

In order fixedly to maintain the channel members 13 and 14 in vertical interfitted relationship, and to increase the strength and rigidity of the support 10, a second locking means 62 is provided which is adapted to be inserted through an elongated slot 60 defined in the web 17 of the channel member 13 and a plurality of apertures 61, having portions thereof in communication with adjacent apertures, defined in the web 32 of the channel member 14, as best shown in Figs. 1 and 3. The elongated slot 60 and plurality of communicating apertures 61 are so disposed in the webs 17 and 32 of the channel members 13 and 14 as to be in vertical alignment when the members 13 and 14 are in fixed horizontal and vertical interfitted relationship to accommodate the locking means 62. More particularly, the locking means 62 comprises a U-bolt 63 to which is secured, as by welding or otherwise, a transverse abutment 64 at a point removed from the ends of the U-bolt 63, which abutment 64 is adapted to engage the bottom surface of the web 32 of the channel member 14. An abutment plate 65, fastening nuts 66 and locking nuts 67 are utilized fixedly to clamp the channel members 13 and 14 together, as best shown in Fig. 2. The abutment plate 65 is apertured at 68 and 69 to receive therethrough the arms of the U-bolt 63 and is of such width as to overlap portions of the web 17 of the channel member 13 adjacent to the elongated slot 60. Likewise, the abutment 64 of the U-bolt 63 has a width sufficient to overlap portions of the web 32 of the channel member 14 adjacent the plurality of communicating apertures 61.

As best shown in Figs. 2 and 4, the bolt 54 is disposed perpendicularly between the arms of the U-bolt so that the apertures defined in the flanges 30 and 31 and the web 32 of the channel member 14 must be in cooperative relationship to permit the bolt 54 to pass through the arms of the U-bolt 63, regardless of which of the selected sets of aligned apertures 50, 51, 52, and 53 the bolt 54 is disposed within. The U-bolt 63, in addition to maintaining the channel members in interfitted relationship, serves the additional function of supporting pole line equipment between the pole cross arms. As illustrated in Figs. 1 and 2, an insulator string end part 70 is fixedly secured to the bight portion of the U-bolt 63 for the purpose of supporting an insulator string (not shown) conventionally used with power transmission poles.

One of the advantages of the present invention resides in the utilization of a first and second locking means which function entirely independently of one another to maintain the parts of the adjustable support in assembled relationship. It will be evident that in installation only the first locking means may be used to obtain a selected length preparatory to mounting the adjustable support upon a pair of pole cross arms. In fact, a multitude of adjustable supports 10 may be mounted upon an entire line of poles in advance of suspending the lines and auxiliary line supporting insulators therefrom. At a later date the second locking means may readily be utilized to secure the line insulators to the poles, which second locking means, as described above, also serves to maintain the channel members 13 and 14 in interfitting relationship and to increase the rigidity and strength of the support. On the other hand, both the first and second locking means may be assembled with the other parts of the support concurrently with mounting the support on the cross arms.

While the details of the present invention have been described in connection with an illustrative embodiment thereof, it should be understood that such details are not intended to limit the invention since many modifications will be apparent to those skilled in the art, which, nevertheless, fall within the true spirit and scope of the invention as set forth in the accompanying claims.

Having thus described the invention, what is claimed as new and desired to be secured by Letters Patent of the United States is:

1. An adjustable support for assembling first and second spaced pole cross arms comprising first and second elongated interfitting channel members, said first channel members having spaced flanges interconnected by a web, said flanges being terminated at one end by oppositely extending feet adapted to engage a side of the first of said pole cross arms, said web having a first bracket including a first extension extending in the same direction as said flanges and adapted to engage the side of said first cross arm and further including a first projection adapted to engage the top of said first cross arm, said second channel member having spaced flanges interconnected by a web, the flanges on said second channel being terminated at one end by oppositely extending feet adapted to engage a side of the second of said pole cross arms, the web of said second channel having a second bracket including a second extension extending parallel to said first extension and adapted to engage the side of said second cross arm and further including a second projection adapted to engage a top of said second cross arm, said feet and both of said projections respectively being provided with means for accommodating means for securing said channel members to said sides and tops of said cross arms, one of said channel members being inverted with respect to the other channel member and adapted to be moved longitudinally relative to said other member to alter the effective length of the support, said flanges having apertures adapted to be moved into registry when said channel members are inverted and moved longitudinally, one of said webs having a plurality of apertures and the other of said webs having an opening in alignment with said web apertures, first locking means inserted through a selected group of aligned apertures in said flanges to maintain said channel members in predetermined interfitting relationship, and second locking means including a U-bolt disposed through selected web apertures and through said web opening, the web apertures of said channel member being positioned relative to the flange apertures of said channel member so as to permit disposition of said first locking means between the legs of said U-bolt irrespective of the particular set of web apertures in which said U-bolt is disposed.

2. An adjustable support for assembling first and second spaced apart pole cross arms, said support comprising first and second elongated interfitting channel members, said first channel member having spaced flanges interconnected by a web, said flanges being terminated at one end by oppositely extending feet adapted to engage a side of the first of said cross arms, said web having a first bracket including a first extension extending in the same direction as said flanges and adapted to engage the side of said first cross arm and further including a first projection adapted to engage the top of said first cross arm, said second channel member having spaced flanges interconnected by a web, the flanges on said second channel being terminated at one end by oppositely extending feet adapted to engage a side of the second of said cross arms, the web of said second channel having a second bracket including a second extension extending parallel to said first extension and adapted to engage a side of said second cross arm and further including a second projection in flush engagement with a top of said second cross arm, said feet and both of said projections respectively being provided with means for accommodating means to secure said channel members to said sides and tops of said cross arms, one of said channel members being inverted with respect to the other channel member and adapted to be moved longitudinally relative to said other member to alter the effective length of the support, said flanges having apertures adapted to be moved into registry when said channel members are inverted and moved longitudinally and said webs having openings in alignment when said channel members are inverted and moved longitudinally, first locking means inserted through a selected group of aligned apertures in said flanges to maintain said channel members in predetermined interfitting relationship, and second locking means including a U-bolt disposed through said web openings, said first locking means being disposed between the legs of said U-bolt irrespective of the set of apertures in which the first locking means is located.

3. An adjustable support for assembling first and second spaced pole cross arms comprising first and second elongated interfitting channel members, said first channel member having spaced flanges interconnected by a web, said flanges being terminated at one end by oppositely extending feet adapted to engage a side of the first of said pole cross arms, said web having a first bracket including a first extension extending in the same direction as said flanges and adapted to engage the side of said first cross arm and further including a first projection adapted to engage the top of said first cross arm, said second channel member having spaced flanges interconnected by a web, the flanges on said second channel being terminated at one end by oppositely extending feet adapted to engage a side of the second of said pole cross arms, the web of said second channel having a second bracket including a second extension extending parallel to said first extension and adapted to engage the side of said second cross arm and further including a second projection adapted to engage a top of said second cross arm, said feet and both of said projections respectively being provided with means for accommodating means for securing said channel members to said sides and tops of said cross arms, one of said channel members being inverted with respect to the other channel member and adapted to be moved longitudinally relative to said other member to alter the effective length of the support, said flanges having apertures adapted to be moved into registry when said channel members are inverted and moved longitudinally, one of said webs having a plurality of apertures and the other of said webs having an opening in alignment with said web apertures, first locking means inserted through a selected group of aligned apertures in said flanges to maintain said channel members in predetermined interfitting relationship, and second locking means disposed through said web opening and at least a selected one of said web apertures to maintain said channel members in predetermined interfitting relationship.

4. An adjustable support for assembling first and second spaced apart pole cross arms, said support comprising first and second elongated interfitting channel members, said first channel member having spaced flanges interconnected by a web, said flanges being terminated at one end by oppositely extending feet adapted to engage a side of the first of said cross arms, said web having a first bracket including a first extension extending in the same direction as said flanges and adapted to engage the side of said first cross arm and further including a first portion adapted to engage the top of said first cross arm, said second channel member having spaced flanges interconnected by a web, the flanges on said second channel being terminated at one end by oppositely extending feet adapted to engage a side of the second of said cross arms, the web of said second channel having a second bracket including a second extension extending parallel to said first extension and adapted to engage a side of said second cross arm and further including a second projection in flush engagement with a top of said second cross arm, said feet and both of said projections respectively being provided with means for accommodating means to secure said channel members to said sides and tops of said cross arms, one of said channel members being inverted with respect to the other channel member and adapted to be moved longitudinally relative to said other member to alter the effective length of the support, said flanges having apertures adapted to be moved into registry when said channel members are inverted and moved longitudinally and said webs having openings in alignment when said channel members are inverted and moved longitudinally, first locking means inserted through a selected group of aligned apertures in said flanges to maintain said channel members in predetermined interfitting relationship, and second locking means disposed through said aligned web openings to maintain said channel members in predetermined interfitting relationship.

References Cited in the file of this patent

UNITED STATES PATENTS

| | | |
|---|---|---|
| 786,054 | Roy | Mar. 28, 1905 |
| 958,933 | Love | May 24, 1910 |
| 1,189,059 | Chaffin | June 27, 1916 |
| 1,213,865 | Gunn | Jan. 30, 1917 |
| 1,506,330 | Vandy | Aug. 26, 1924 |
| 1,793,035 | Whitney | Feb. 17, 1931 |
| 1,812,756 | Riggs | June 30, 1931 |
| 2,537,437 | Aaby | Jan. 9, 1951 |

FOREIGN PATENTS

| | | |
|---|---|---|
| 166,348 | Austria | July 10, 1950 |